United States Patent
Kmetz et al.

(10) Patent No.: US 8,230,689 B2
(45) Date of Patent: Jul. 31, 2012

(54) PRELIMINARY VEHICLE HEATING AND COOLING BY PELTIER EFFECT

(75) Inventors: Scott M. Kmetz, Romeo, MI (US); Jean-Christophe Deniau, Fenton, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 1022 days.

(21) Appl. No.: 12/146,775

(22) Filed: Jun. 26, 2008

(65) Prior Publication Data
US 2009/0000311 A1    Jan. 1, 2009

Related U.S. Application Data

(60) Provisional application No. 60/937,265, filed on Jun. 26, 2007.

(51) Int. Cl.
*F25B 21/02* (2006.01)
(52) U.S. Cl. ............................................. 62/3.3; 62/244
(58) Field of Classification Search ...... 62/3.2, 62/3.3, 3.6, 6.61, 159, 244, 261, 259.3; 136/210, 136/218, 203
See application file for complete search history.

(56) References Cited

U.S. PATENT DOCUMENTS

| | | | |
|---|---|---|---|
| 4,280,330 A | | 7/1981 | Harris et al. |
| 5,524,439 A | * | 6/1996 | Gallup et al. ................... 62/3.5 |
| 7,779,639 B2 | * | 8/2010 | Goenka .......................... 62/3.61 |
| 2005/0257531 A1 | * | 11/2005 | Kadle et al. ..................... 62/3.3 |
| 2006/0150657 A1 | | 7/2006 | Spurgeon et al. |
| 2007/0101747 A1 | * | 5/2007 | Eisenhour ........................ 62/332 |
| 2007/0157631 A1 | * | 7/2007 | Huang et al. ..................... 62/3.3 |
| 2007/0234742 A1 | * | 10/2007 | Aoki et al. ....................... 62/3.3 |

FOREIGN PATENT DOCUMENTS

| | | |
|---|---|---|
| DE | 102004057640 | 6/2006 |
| EP | 1726462 | 11/2006 |

OTHER PUBLICATIONS

International Search Report and Written Opinion mailed on Oct. 7, 2008.
International Preliminary Report on Patentability mailed on Jan. 14, 2010.

\* cited by examiner

*Primary Examiner* — Melvin Jones

(57) ABSTRACT

A climate control system includes the interim heating/cooling component that operates in the interim duration prior to the heating and cooling systems reaching a desired state of readiness. The interim heating/cooling device uses the Peltier effect to transfer heat between first and second sides depending on a polarity of current. Controlling which of the two sides is heated provides the desired heating or cooling of the air. Once the heating or cooling system reaches the desired state of readiness, the interim heating/cooling device is turned off.

12 Claims, 2 Drawing Sheets

PRELIMINARY VEHICLE HEATING AND COOLING BY PELTIER EFFECT

CROSS REFERENCE TO RELATED APPLICATION

The application claims priority to U.S. Provisional Application No. 60/937,265 which was filed on Jun. 26, 2007.

BACKGROUND OF THE INVENTION

This disclosure generally relates to vehicle heating and cooling systems. More particularly, this disclosure relates to a vehicle heating and cooling system that includes a device for providing both heating and cooling during initial vehicle warm up.

Conventional heating, ventilating and air conditioning systems (HVAC) for vehicles rely on a vehicle engine or compressor reaching a desired state of readiness. Accordingly, a driver entering a vehicle encounters a delay in receiving either heated or cooled air and therefore will be uncomfortable for some interim period in very cold or very hot environments. In some instances, the vehicle climate control system may even blow cold air until the engine is properly warmed, or blow hot air until the compressor has cycled to a ready condition. Some systems are programmed not to engage until either hot or cold air is available. However, in such cases, the driver is still not comfortable during the initial run up period of the climate control system.

Accordingly, it is desirable to design and develop an improved vehicle climate control system that reduces or substantially eliminates delays in receiving warm or cooled air.

SUMMARY OF THE INVENTION

An example climate control system for a motor vehicle includes an electrically driven interim heating/cooling component for selectively heating and cooling air until a heating or cooling system attains a desired state of readiness.

The example climate control system includes the interim heating/cooling component that operates in the interim duration prior to the heating and cooling systems reaching a desired state of readiness. The interim heating/cooling device uses a Peltier device to transfer heat between first and second sides depending on a polarity of current. The direct current supply to the interim heating/cooling device causes one of the first and second sides to heat up and the other of the first and second sides to cool. One of the sides is exposed to the blowing air stream through the climate control system ducts and the other side is vented to an ambient environment. Controlling which of the two sides is heated provides the desired heating or cooling of the air. Once the heating or cooling system reaches the desired state of readiness, the interim heating/cooling device is turned off.

Accordingly, the disclosed climate control system provides heated or cooled air in the interim period prior to the heating and cooling systems reaching a desires state of readiness.

These and other features of the present invention can be best understood from the following specification and drawings, the following of which is a brief description.

DETAILED DESCRIPTION OF THE PREFERRED EMBODIMENT

Figure 1:
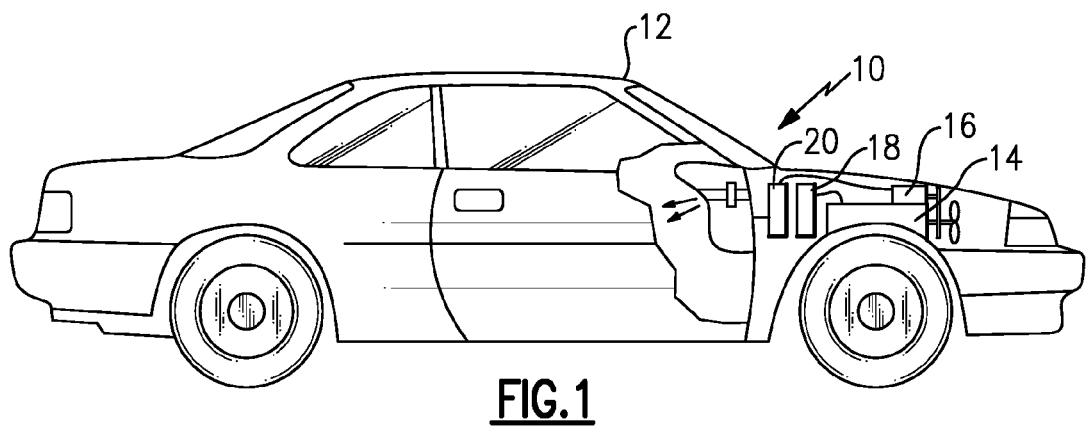
FIG. 1 is a schematic view of a vehicle including an example climate control system.
Figure 2:
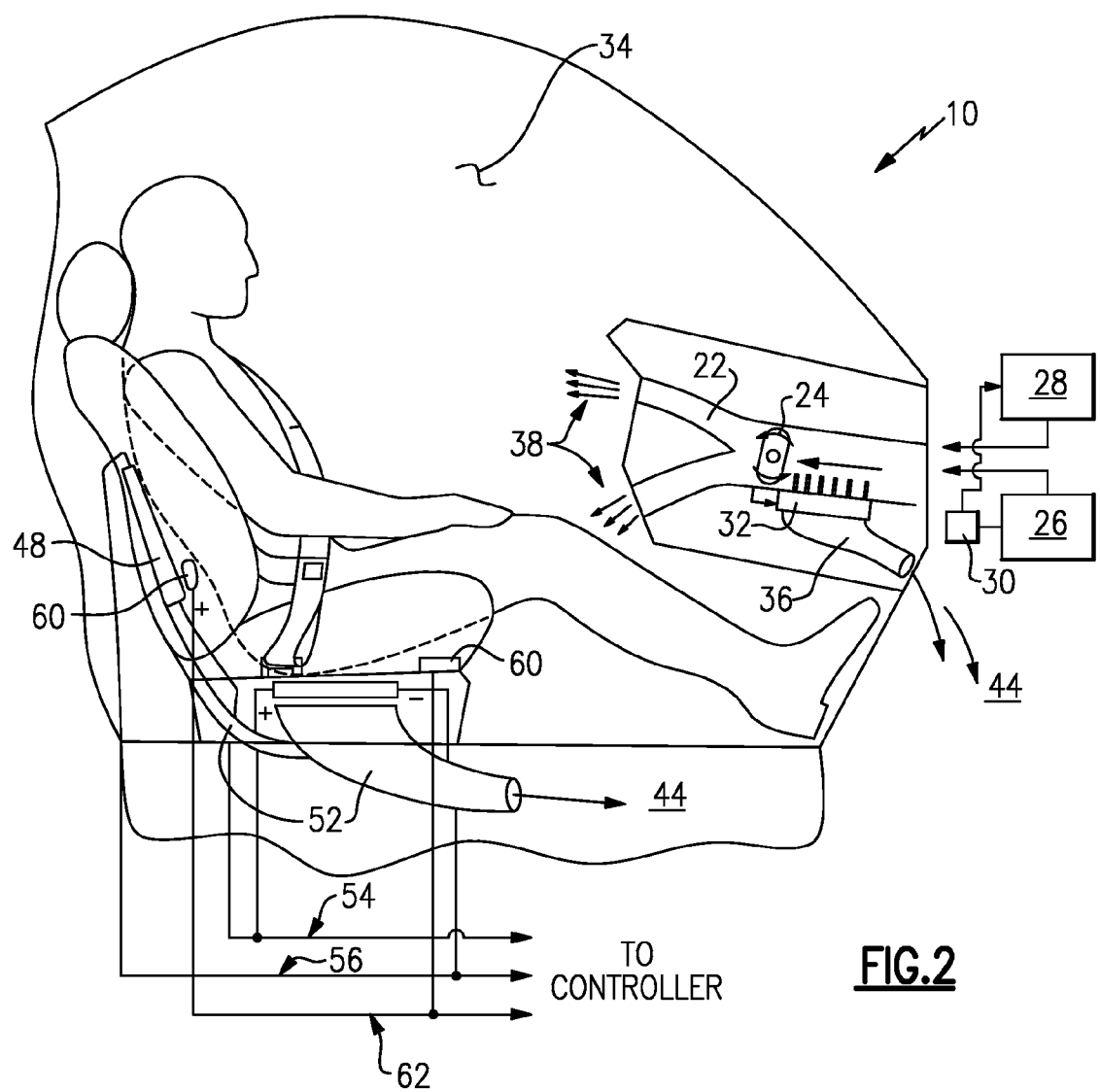
FIG. 2 is a schematic view of a vehicle cabin including the example climate control system.

Referring to FIGS. 1 and 2 an example climate control system 10 commonly referred to as a heating, ventilating and air conditioning system (HVAC) includes a heat exchanger 19 and a condenser 20. A vehicle 12 includes an engine 14 that utilizes cooling fluid that is circulated through the heat exchanger for heating air. A compressor 16 is driven by the engine 14 and circulates refrigerant through a cooling circuit that includes a condenser 20 for cooling air. The engine 14 and compressor 16 require an interim time before heating or cooling can be accomplished.

During the interim time, air at a desired temperature is not available. In other words, in cold weather, the climate control system 10 would blow cold air, and blow hot air in warm weather. The example climate control system 10 includes an interim heating/cooling component 32 that provides heating and cooling of air during the interim period until the engine 14 or compressor achieve a desired state of readiness.

Figure 3:
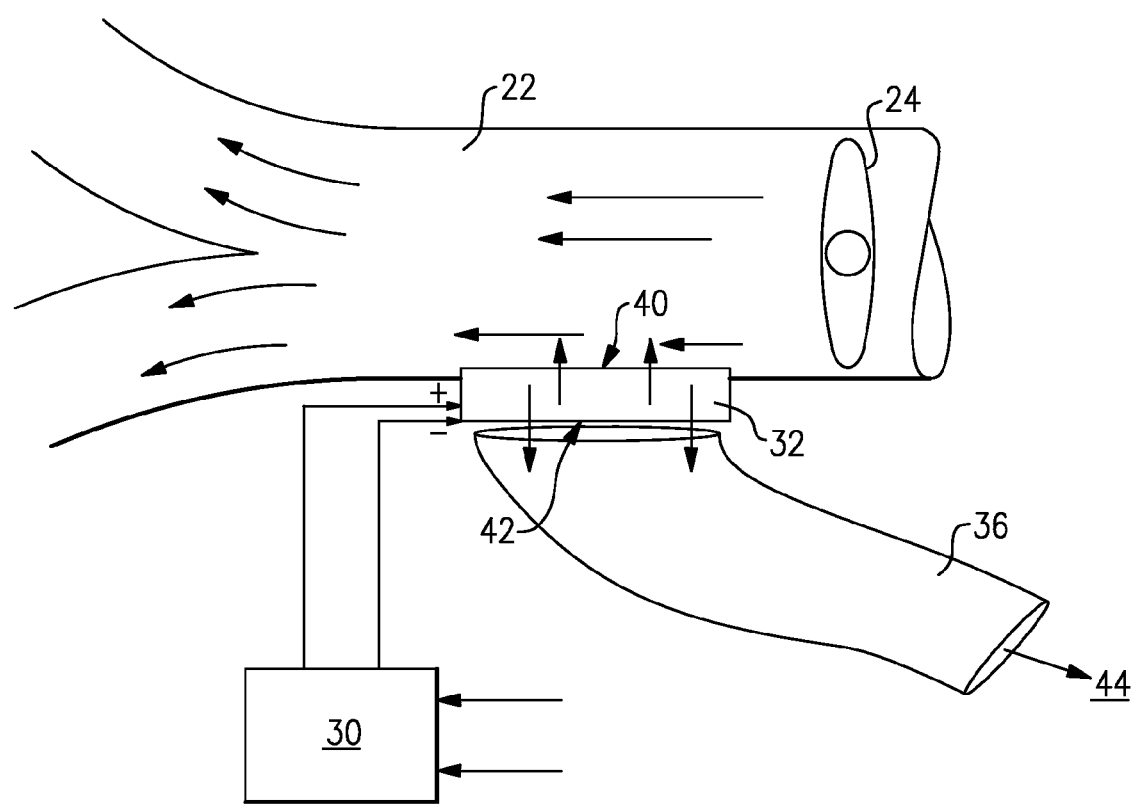
FIG. 3 is a schematic view of a duct of the example climate control system.

Referring to FIGS. 2 and 3, the example climate control system 10 includes a heating circuit 26 and a cooling circuit 28. The heating circuit 26 utilizes the heat exchanger 18 to transfer heat from engine cooling fluid into air blown through ducts 22 that lead into the vehicle cabin 34. The cooling circuit 28 includes the compressor 16 driven by engine 14 and the condenser 20 draws heat from air through the expansion and contraction of refrigerant. A controller 30 governs operation of the heating and cooling circuits 26, 28 to provide conditioned air to the vehicle cabin 34. In the interim duration prior to the heating and cooling circuits 26, 28 reaching a desired state of readiness, the controller 30 activates the interim heating/cooling device 32.

The example interim heating/cooling device 32 is an electrically operated Peltier device that heats and cools air as is desired. A Peltier device includes opposing sides fabricated from a material that increases in temperature responsive to an electric current. One side heats, while the other side cools. Heat from the hot side is drawn through the device and exhausted from the cool side. The side that heats can be selected depending on a polarity of the electric current.

Air is driven over the heating/cooling device 32 by the blower 24. The heating/cooling device 32 will either heat or cool air 38 depending on a polarity of current provided by the controller. The application of a direct current supply to the interim heating/cooling device 32 causes one of the first and second sides 40, 42 to heat up and the other of the first and second sides to cool. Reversing polarity of the direct current causes a corresponding reversal in which of the two sides 40, 42 is heated or cooled.

The example climate control system 10 also includes heating/cooling devices disposed within the seat 58. A first and second Peltier heating/cooling component 48, 50 are mounted within the seat and operate to selectively cool or heat the seat depending on a polarity of direct current. One side of each of the first and second Peltier heating/cooling components 48, 50 is placed in thermal communication with an exhaust vent 52 that in turn is in communication with the ambient environment indicated at 44. The first and second Peltier heating/cooling components are controlled through electrical conduits 54, 56 by the controller 30. Variation of the polarity and level of direct current to the first and second Peltier heating/cooling components 48, 50 provide the desired levels of heating and cooling. A temperature sensor 60 provides information through link 62 utilized by the controller 30 to regulate seat temperature.

Referring to FIG. 3, the interim heating/cooling device 32 uses the Peltier effect to transfer heat between a first side 40 and a second side 42 depending on a polarity of current supplied by the controller 30. The interim heating/cooling device 32 includes the first side 40 that is within the duct 22 and in thermal communication with air flowing therethrough. The second side 42 is in thermal communication through vent 36 with an ambient environment indicated schematically at 44.

In operation, prior to engagement of one of the heating circuit 26 and the cooling circuit 28, the controller 30 actuated the interim heating/cooling device 32 by supplying a direct current of a defined polarity. In this example, heating of the air stream flowing through the vent is desired. Accordingly, the direct current sent to the interim heating/cooling device 32 is set to a first polarity that causes the first side 40 that is in thermal contact with the air stream to heat up. The second side 42 cools. Because the efficiency of the interim heating/cooling device 32 is low compared to the heating system 26, the interim heating/cooling device 32 is only operated until the heating system 26 reaches a desired state of readiness.

When cooling is desired, the direct current to the interim heating/cooling device 32 is reversed to a second polarity that causes the second side 42 to heat up and the first side 40 to cool. Heat from the second side 42 is exhausted through the exhaust vent 36 and into the ambient environment. Exhausting heat from the second side 42 provides for the evacuation of heat out of the duct 22 and into the ambient environment.

In either heating or cooling applications, the amount of direct current can be varied to adjust the difference in temperature between the first and second sides 40 and 42. In this way, the temperature of the air stream 22 can be adjusted. Additionally, the surface area of the first and second sides 40 and 42 can be adjusted to provide the desired thermal transfer with the air stream within the duct 22. The first and second sides 40, 42 reach the respective temperatures in substantially less time than required for either the heating or cooling circuits 26, 28 to reach a require state of readiness. Accordingly, the example climate control system 10 provides heating and cooling operations during the interim period required for the heating and cooling systems to reach a desired state of readiness.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A climate control system for a motor vehicle comprising:
   a duct system for directing conditioned air into a vehicle cabin;
   a heating circuit for heating the conditioned air;
   a cooling circuit for cooling the conditioned air; and
   an electrically powered interim heating/cooling component in communication with the duct system, wherein the interim heating/cooling component is operable for heating or cooling air blowing through the duct system prior to one of the heating circuit and the cooling circuit reaching a desired state of readiness, wherein the interim heating/cooling component includes a first side exposed to the conditioned air, and a second side in communication with an environment outside of the motor vehicle.

2. The system as recited in claim 1, wherein the interim heating/cooling component is operable to heat the first side responsive to an electric current having a first polarity and to heat the second side responsive to the electric current having a second polarity opposite from the first polarity.

3. The system as recited in claim 2, wherein the interim heating/cooling component is operable to cool the first side responsive to the electric current having the second polarity.

4. The system as recited in claim 1, wherein the interim heating/cooling component comprises a Peltier element.

5. The system as recited in claim 1, including at least one heating/cooling component disposed within a vehicle seat, wherein the at least one heating/cooling component comprises a Peltier element.

6. A method of conditioning air for a motor vehicle prior to reaching a desired ready state comprising;
   actuating an electrically operable interim heating/cooling component to provide one of cooling and heating an air stream;
   placing a first side of the interim heating/cooling component in communication with the air and placing a second side of the interim heating/cooling component in communication with an environment outside of the motor vehicle;
   directing air over the interim heating/cooling component; and
   deactivating the interim heating/cooling component after a desired ready state is achieved.

7. The method as recited in claim 6, wherein actuating the interim heating/cooling component comprises directing an electric current through the interim heating/cooling component.

8. The method as recited in claim 7, including the step of selecting between a first polarity of the electric current and a second polarity of electric current in response to a desired cooling operation or a desired heating operation.

9. An interim heating and cooling assembly for installation within an automotive climate control system, the assembly comprising:
   a controller connectable to a vehicle climate control system for receiving information indicative of a state of readiness; and
   an electrically operable interim heating/cooling component selectively actuated to function to either communicate heat or draw heat from a stream of air from the climate control system, wherein a first side of the interim heating/cooling component is in communication with the stream of air, and a second side of the interim heating/cooling component is in communication with an environment outside of an interior of an automobile.

10. The assembly as recited in claim 9, wherein the controller governs a polarity of electric current driving the interim heating/cooling component.

11. The assembly as recited in claim 9, wherein an electric current at a first polarity provides for heating of the stream of air, and a second polarity opposite of the first polarity provides for cooling of the stream of air.

12. The assembly as recited in claim 9, wherein the interim heating/cooling component is deactivated upon the controller receiving data indicating a desired state of readiness of the vehicle climate control system.

* * * * *